D. ROSEN.
FLAG HOLDER.
APPLICATION FILED SEPT. 7, 1917.
1,256,370.
Patented Feb. 12, 1918.
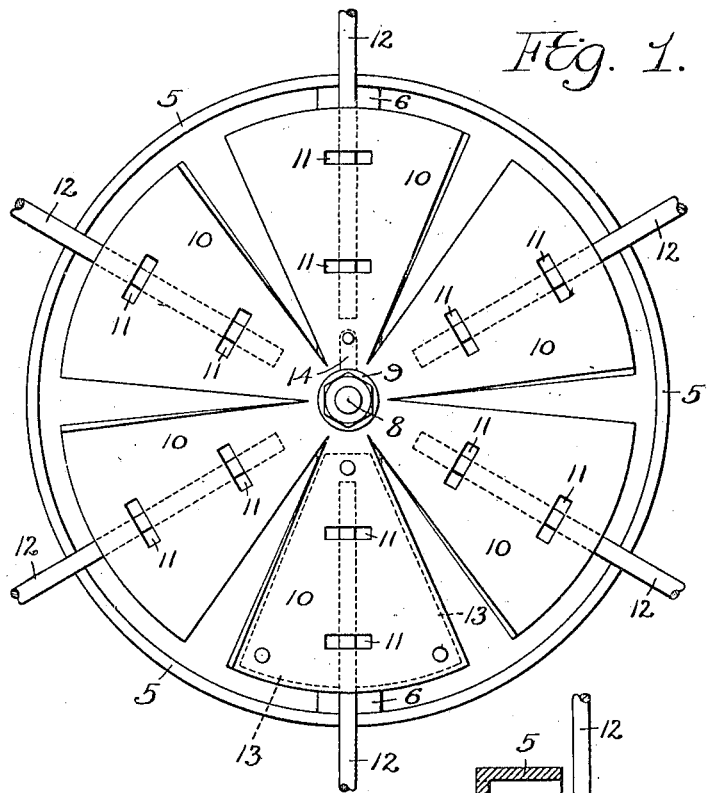
Fig. 1.
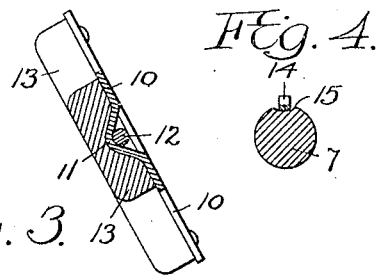
Fig. 3.
Fig. 4.
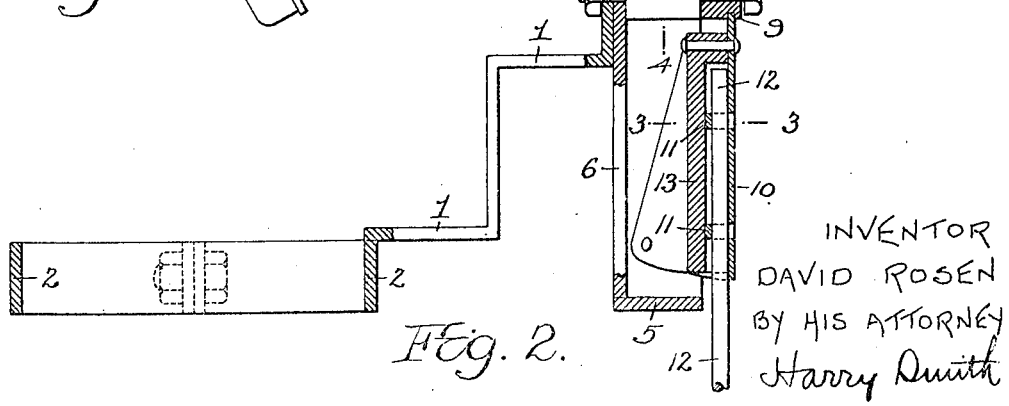
Fig. 2.
INVENTOR
DAVID ROSEN
BY HIS ATTORNEY
Harry Smith

UNITED STATES PATENT OFFICE.

DAVID ROSEN, OF PHILADELPHIA, PENNSYLVANIA.

FLAG-HOLDER.

1,256,370.

Specification of Letters Patent.

Patented Feb. 12, 1918.

Application filed September 7, 1917. Serial No. 190,162.

*To all whom it may concern:*

Be it known that I, DAVID ROSEN, a citizen of the United States, residing in Philadelphia, Pennsylvania, have invented certain Improvements in Flag-Holders, of which the following is a specification.

My invention relates to flag holders such as are frequently attached to the radiator caps of automobiles for the purpose of displaying a number of small flags as a decoration. The primary object of my invention is to so construct such a flag holder that when the automobile is in motion the flags will be caused to whirl about a central axis, and a further object is to cause the flag holder to remain stationary when the automobile is stopped, and to insure the stopping of the holder in such position that the same flag will always be upright at such times.

These objects I attain in the manner hereinafter set forth, reference being had to the accompanying drawing, in which—

Figure 1 is a face view of a flag holder constructed in accordance with my invention;

Fig. 2 is a view partly in elevation and partly in vertical section through the same, and Figs. 3 and 4 are, respectively, sectional views on the lines 3—3 and 4—4, Fig. 2.

The device shown is mounted upon a supporting bracket 1 which is provided with a clamp 2 adapted to embrace and be attached to the radiator cap of an automobile, and it comprises a circular guard frame 5 having a vertical brace 6 to which is secured a central stud 7, the latter having a projecting pin 8 which serves as an axle for the hub 9 of the flag-carrying wind-wheel. This wind-wheel has a plurality of radially projecting and laterally inclined blades 10, each of which is provided with a pair of clips 11 for the reception and retention of a flag-staff 12.

When an automobile upon which such a flag holder is mounted is in motion the air will impinge upon the faces of the blades 10 and will cause the wind-wheel to rotate about the axle 8. As the wheel rotates the flags carried by the blades thereof will spin around and present a unique and novel appearance. When the automobile stops, the cessation of the induced wind pressure upon the faces of the blades of the wheel will permit the wheel to come to rest, and it will so remain until the car is again started.

Automobile flag holders are usually equipped with flags of different nations and when a flag holder such as that constituting my invention is used, it is desirable that the wind-wheel shall always stop with the American flag uppermost. To accomplish this, I attach to that blade diametrically opposite to the blade which carries the American flag, a weight 13. When the wind-wheel comes to rest, this weight will naturally cause the blade to which it is attached to assume the lowermost position and the flag carried by the opposite blade will, consequently be uppermost.

To prevent undesired rotation or oscillation of the wind-wheel, such as might be caused by natural air curernts striking the blades 10 when the automobile is stationary, I equip one of the blades with a spring finger 14 adapted to engage a groove 15 in the face of the stud 7. When the wheel has been brought into proper position by the action of the weight 13 the spring finger will engage the groove and hold the wheel against casual movement. The groove 15 is so shallow, however, and has its sides so beveled that when the automobile is in motion the tendency of the wheel to rotate will cause disengagement of the finger from the groove so as to permit such rotation, the finger "clicking" past the groove with each turn of the wheel.

Although I have illustrated my invention as a flag holder for automobiles I do not limit myself to this use, as it might well be used as a toy or advertising novelty.

I claim:

1. The combination of a wind-wheel having a hub from which project inclined blades and adapted to be rotated about a fixed axle by the action of an air current upon the blades, with means for causing said wheel to come to rest in a certain position of circumferential adjustment.

2. The combination of a wind-wheel having a hub from which project inclined blades and adapted to be rotated about a fixed axle by the action of an air current upon the blades, with means for causing said wheel to come to rest in a certain position of circumferential adjustment, said means consisting of a weight attached to one of the blades of said wheel.

3. The combination of a wind-wheel having a hub from which project inclined blades and adapted to be rotated about a fixed axle by the action of an air current upon the blades, with means for causing said wheel to come to rest in a certain position of circumferential adjustment, and releasable means for retaining said wheel in such position.

4. The combination of a wind-wheel having a hub from which project inclined blades and adapted to be rotated about a fixed axle by the action of an air current upon the blades, with releasable means for retaining said wheel in a position of circumferential adjustment, said means consisting of a spring finger carried by the wheel and engaging a groove in a fixed stud adjacent to the hub of said wheel.

5. The combination of a wind-wheel having a hub from which project inclined blades and adapted to be rotated about a fixed axle by the action of an air current upon the blades, with releasable means for retaining said wheel in a certain position of circumferential adjustment, said means consisting of a spring finger carried by the wheel and engaging a groove in an adjacent fixed stud, said groove having beveled sides.

In testimony whereof, I have signed my name to this specification.

DAVID ROSEN.

Copies of this patent may be obtained for five cents each, by addressing the "Commissioner of Patents, Washington, D. C."